No. 739,642. PATENTED SEPT. 22, 1903.
F. E. BOCORSELSKI.
UNIVERSAL JOINT.
APPLICATION FILED FEB. 10, 1903.
NO MODEL.
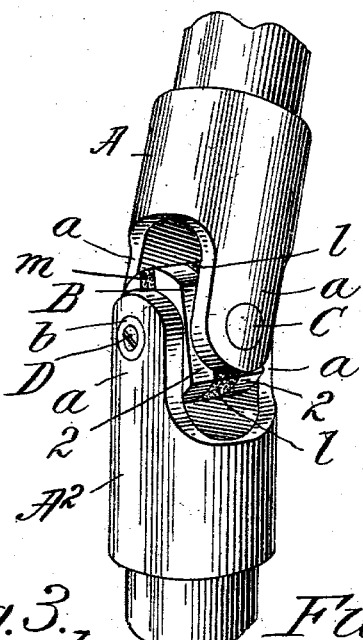
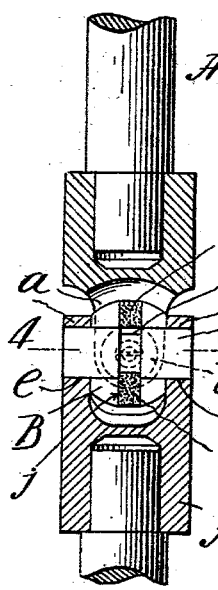
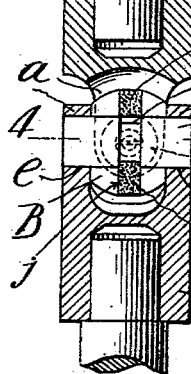
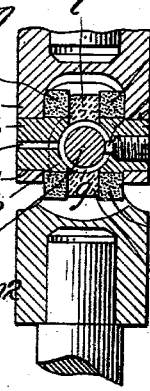
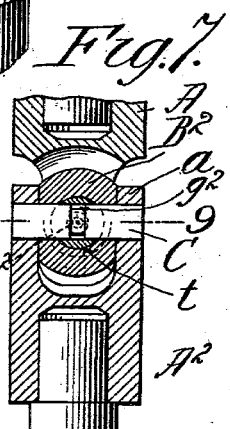
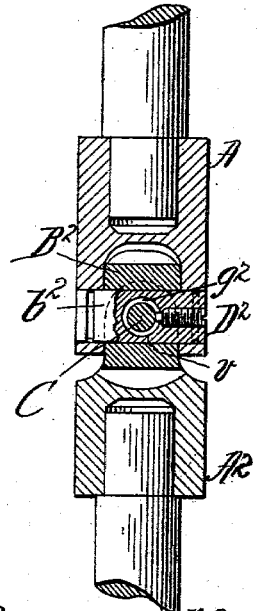
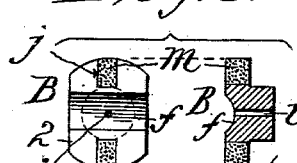
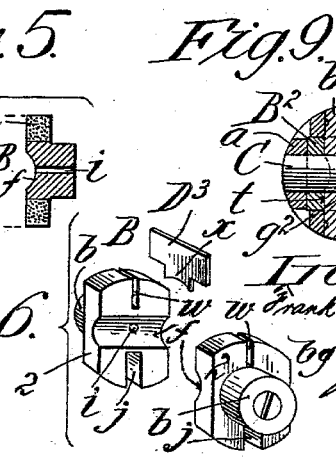
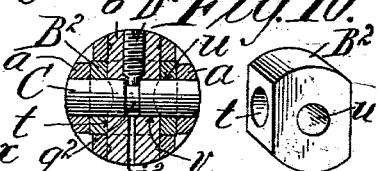
Witnesses:
J. W. Garfield
M. S. Crosier
Inventor,
Frank E. Bocorselski,
by Wm. J. Bellona,
Attorney.

No. 739,642. Patented September 22, 1903.

UNITED STATES PATENT OFFICE.

FRANK E. BOCORSELSKI, OF SPRINGFIELD, MASSACHUSETTS.

UNIVERSAL JOINT.

SPECIFICATION forming part of Letters Patent No. 739,642, dated September 22, 1903.

Application filed February 10, 1903. Serial No. 142,771. (No model.)

*To all whom it may concern:*

Be it known that I, FRANK E. BOCORSELSKI, a citizen of the United States of America, and a resident of Springfield, in the county of Hampden and State of Massachusetts, have invented certain new and useful Improvements in Universal Joints, of which the following is a full, clear, and exact description.

This invention relates to improvements in universal joints of the character shown and described in my Letters Patent of the United States dated January 27, 1903, No. 719,411, and certain features comprised in the present invention have applicability not only in respect of the joint patented, as aforesaid, but also in respect of universal joints such as shown in Letters Patent of the United States issued to me September 18, 1900, No. 658,057, and of other joints having certain characteristics in common with those shown in both of said patents.

One object of the invention is to provide in a joint having a minimum number of easily-produced, simple, and easily-assembled parts a single retaining-piece which without liability of itself becoming detached holds every part of the universal joint in their properly-interlocked engagements.

Another object of the invention is to assure that one of the structural features pertaining to the means of retention of all of the parts of the joint against disconnection, as aforementioned, may contribute as a factor in the ways and means of lubricating the joint. Novelties also reside in provision and arrangement of parts for lubricating portions of the joint not necessarily involving any feature essentially pertaining to the locking means, and a composite object of the invention is carried out in constructions and arrangements of parts in the joint which not only prevent displacement or disengagement of the joint-constituting parts, but enable that every part of the joint having a bearing or working movement relatively to another part will be amply and effectually oiled.

The invention consists in part in a universal joint comprising two shaft-sections, each thereof having paired jaws, an intermediate transmission member, and members transversely extended at opposite sides of the transmission member, having bearings for rotational movements in the jaws of one shaft-section and a pivot passing through and between the jaws of the other section and engaging centrally relatively to the transmission member, having between its ends a peripheral groove and a retaining-piece penetrating a supporting part therefor of the joint in a line radially to the central pivot and having an inner end engagement in the peripheral groove of the latter.

The invention also consists in the provision in certain parts of the joint shown in my patent of January 27, 1903, of certain peculiar and novel structural features and in the combination, with the so-constructed parts, of the patented joint of additional parts or appliances for locking the joint together, for lubricating certain parts of the joint, and for both locking the parts of the joint together and for insuring the lubrication of every part of the joint at which lubrication is desired, and all substantially as hereinafter more fully described, and set forth in the claims.

In the drawings, Figures 1 to 6, inclusive, show all of the improvements comprised in this invention as embodied in a universal joint of the kind shown in my Letters Patent of January 27, 1903, Fig. 1 being a perspective view; Figs. 2 and 3, longitudinal sectional views on planes at right angles to each other, certain parts of the device, however, appearing in elevation; Fig. 4, a horizontal cross-section on line 4 4, Fig. 2; Fig. 5, an illustration of one of the two-part intermediate or transmission block of the joint; and Fig. 6, a perspective representation of the two-part transmission-block, having a special feature of construction in modification of the locking or retention piece from the specific form exhibited in the preceding views. Figs. 7 to 10, inclusive, show the same idea of means for the locking of all of the parts of the joint together by a single retaining-piece as dominated by one part of this invention, applicable in respect of substantially the same character of universal joint as embodied in the aforementioned patent of September 18, 1900.

Similar characters of reference indicate similar or analogous parts in all of the views.

Referring to the drawings, Figs. 1 to 6, A and $A^2$ represent the two shaft-sections, both having similar paired separated jaws *a a*, the pairs of both sections straddling and fitting about the sides of the intermediate transmission-block B, which, as well known, in my last-issued patent is constructed divided or in two sections 2 2, having each the outwardly-extending trunnion *b*, of cylindrical form, having a close fit and journal-bearing in one of the socket-holes *d* in a shaft-section jaw, such socket-holes in both jaws of one of the shaft-sections being in axial alinement.

The inner faces of the transmission-block sections 2 2 have the opposite parallel grooves *f f* conformable to the cylindrical central pivot C, which is disposed between the transmission-block sections, holding them in their separated relations and crowded, so that the outer faces of the sections are in bearing against the inner faces of the shaft-section jaws in the sockets *d* of which the trunnions are entered, said central pivot having its disposition axially in the same plane as the axis of the trunnions and trunnion-sockets *d*; but its length is at right angles to the axis of the trunnions and trunnion-sockets, and its end portions have bearings and supports in and through the sockets *e* in alinement in and through the separated jaws of the other shaft-section $A^2$.

As a new feature the central pivot C is intermediately preferably centrally constructed with the annular groove *g*, and the trunnion of one section 2 of the divided intermediate transmission-block B is axially penetrated by the retaining-piece D, which is here shown as in the form of a plug-screw engaging from the outer end of the trunnion not only through the length of the latter, but also transversely through the section 2, such plug having at its inner end a teat *h*, which protrudes beyond the inner surface of the groove *f* and engages in the aforesaid peripheral groove *g* in the central pivot, and inasmuch as such central pivot when in place holds all of the parts of the joint in their proper assemblage and working relations the retention of the pivot by the inner protruding end teat of the screw-plug is all sufficient to assure the locked engagement of all of the parts of the joint throughout the most protracted use thereof.

Leading through a suitable part of the joint to communication with the peripheral groove of the pivot is a duct *i*, the same being preferably axially through the trunnion of the other section 2 of the transmission-block and through the body of the block, reaching the peripheral groove at the opposite sides from that at which the locking-plug engages, as aforesaid.

Absorbent sections 1 1 for receiving and holding lubrication are located between the inner faces of the block members, being held in their places, as shown, frictionally or under some compression, and in Figs. 1, 2, 3, 5, and 6 the trunnion-provided transmission-block sections 2 2 are indicated as constructed with recesses *j*, extending from their ends at one or at opposite sides of the axis of the trunnion inwardly about as far as the junction of the trunnion with the face of the block, such recesses preferably extending entirely through the thickness of each block and receiving sections *m* of felt therein, which sections, receiving lubricant by having it directly applied thereto or coming thereto by way of the duct *i*, groove *g*, absorbent sections 1 1, which act as carriers for oil taken from the groove to the felt sections *m* serve to lubricate the blocks in their outer face-rubbing bearings against the inner surfaces of the jaws of one shaft-section A and also convey lubricant to the bearings between the trunnion peripheries and the sockets therefor in the jaws, and oil from the groove *g* lubricates the grooved inner faces of the divided transmission-block, while the edges of the absorbent sections 1 1 carry lubricant to the rubbing bearings between the edges of the transmission-block sections and the jaws of the shaft-section $A^2$. In short, by pouring oil occasionally into the single duct *i*, leading to the peripheral groove *g*, the oil will be distributed automatically throughout every part of the joint having need therefor.

The transmission-block sections 2 2 when in place in the assembled joint and engaged in the opposite grooved inner faces thereof by the central pivot, having the ends thereof supported in the jaws of one shaft-section, are to all intents and purposes the same as if the transmission-block were made of a single piece so far as the usual mode of action of the joint is concerned, the engagement of the block with one jaw-provided pair of shaft-sections being through means of the central pivot, while the integral outwardly-extending trunnions of the transmission portion intermediately of the joint constitute transverse extensions in alinement and at opposite sides of the block, which are non-rotatable relatively thereto, and a somewhat analogous characteristic will be perceived in the joint shown in Figs. 7 to 10, wherein the intermediate transmission-block $B^2$ is a single piece having a bulk to fill the oppositely and rightangularly straddling pairs of jaws *a* of the two shaft-sections A and $A^2$, this block being penetrated by a comparatively large hole *t* through it, through which is passed a cylindrical bar or thick pin $b^2$, and the block is penetrated by a somewhat smaller hole *u* through it at right angles to the hole *t*, the cylindrical bar $b^2$ having centrally therethrough the hole *v*, matching with the block-hole *u*, such matching holes receiving therethrough the intermediate portion of the centrally peripherally grooved pivot $C^2$, the protruding ends of which are fitted into the sockets therefor of the jaws of one of the shaft-sections. The central pivot penetrating the transmission-block $B^2$ and centrally through the cylindrical bar locks the latter both against rotational and endwise movements relatively to the transmission-block, and hence the opposite protruding end of this cylindrical bar constitutes, in substance, opposite transverse members for the block non-rotatable relatively thereto and which serve in the same manner as the transverse outwardly-extending trunnions $b$ of the other joint, which has hereinabove been described in detail, as the journals for engagement in the sockets of the opposite jaws of the other shaft-section, and in one end portion of the cylindrical bar corresponding, as aforesaid, to one of the trunnions $b$ the screw-plug $D^2$ penetrates to and within the central cross-hole $v$ of said bar, so that the inner end teat of the screw-plug has engagement in the central peripheral groove $g^2$ of the central pivot for preventing the displacement of the latter and the disconnection of any of the parts of the joint for its appropriate position therein.

Through the opposite end of the cylindrical bar $b^2$ the oil-duct $i^2$ is axially formed for the entrance of oil into the groove to be distributed therefrom more or less throughout the joint.

While it is not essential that the retaining plug or piece be located axially at and within the end portions of one of the block-trunnions or the cylindrical bar, which practically constitutes one of such trunnions and as shown in all of the drawings excepting Fig. 6, such arrangement is a very proper and advantageous one; but in order to render apparent in what manner a retaining-piece may be provided to a suitable part of the joint therefor and to have its inner portion in the restraining engagement in the intermediate peripheral groove of the central pivot the view Fig. 6 is provided to show that alined slots $w$ $w$ may be milled from the corresponding ends of both of the transmission-block sections 2 2 and both at the same side from the axis of the trunnions thereof, into which may be driven a flat metallic plate or key $D^3$, which has at its central inner portion the extension $x$, corresponding to the teat of the aforementioned plug D or $D^2$ of the other forms of the joint, for engaging in the intermediate peripheral groove of the central pivot, and it is of course obvious that in the form of the joint shown in Figs. 7, 8, and 9 the retaining-piece may penetrate into and be supported by the intermediate transmission-block body instead of the member transversely extended in the manner of a trunnion outwardly therefrom, and the oil-duct may lead through any member or part of the joint, preferably excepting the central pivot, to the peripheral groove intermediately therein, and while it is true that the feature of this invention comprised in the means for locking the central pivot against its displacement from the joint and to some extent the oiling capabilities comprising a peripheral groove intermediately of the length of the central pivot are applicable in universal joints of the descriptions shown and described in the two aforesaid patents issued to me and perhaps to some other descriptions of joints, the particular entire means for acquiring lubrication of every part of the joint at which lubrication is desirable consisting of the sections 1 1, of felt, between the separated block-sections and the sections $m$ $m$, of felt, in recesses $j$ in and through end portions of the block-sections in combination with the central pivot having at its middle the peripheral groove, and an appropriate part of the joint having an oilway leading to said groove particularly pertains to that species of joint set forth and shown in my patent of January 27, 1903.

Having thus described my invention, what I claim, and desire to secure by Letters Patent, is—

1. A universal joint consisting of two shaft-sections each thereof having paired jaws, an intermediate transmission member, and members transversely extended at opposite sides of the transmission member, having bearings for rotational movements in the jaws of one shaft-section, and a pivot passing through and between the jaws of the other section and engaging centrally relatively to the transmission member, having between its ends a peripheral groove, and a retaining-piece penetrating a supporting part therefor of the joint, in a line radially to the central pivot, and having an inner end engagement in the peripheral groove of the latter.

2. A universal joint consisting of two shaft-sections having paired jaws, an intermediate transmission member and members transversely extended and non-rotatable relatively to the same having bearings for rotational movements in the jaws of one section, a pivot passing through the jaws of the other section centrally of, and in engagement with, the intermediate member, having at its middle part a peripheral groove, and a plug screwing axially through one of the members and having an inner end engagement in the peripheral groove of the central pivot.

3. In a universal joint, in combination two shaft-sections each having separated jaws provided with alined transverse journal-sockets, an intermediate transmission member having therefor opposite transversely-extending journal members for engagement in the sockets of the paired jaws of one shaft-section, the central pivot extending through and engaged in the socket of the other shaft-section jaws, centrally engaging the transmission member in a line at right angles to the said transversely-extending journal members thereof and having between its ends a peripheral groove, one of the parts of the joint having an oil-duct therein leading to said groove, and means for locking the central pivot against axial movement.

4. In a universal joint, in combination, two shaft-sections each having separated jaws provided with alined transverse journal-sockets, an intermediate transmission member having therefor opposite transversely-extending journal members for engagement in the sockets of the paired jaws of one shaft-section, the central pivot extending through, and engaged in, the socket of the other shaft-section jaws, centrally engaging the transmission member in a line at right angles to the said transversely-extending journal members thereof, and having between its ends a peripheral groove, one of the parts of the joint having an oil-duct therethrough leading to said groove, and one of the parts of the joint having a socket therein leading to the groove of the pivot, and a retaining-piece, engaged in said socket, having by its inner end an engagement in said groove.

5. In a universal joint the combination of the two forked shaft-sections having alined apertures transversely through the opposite jaws of the block members having the outwardly-extended trunnions and the opposite parallel inner face-grooves, the pivot engaged in the grooves and holding said blocks in their proper separations and having the central peripheral groove one of the block-trunnions having a duct leading therethrough to the pivot-groove and the other trunnion having a screw-plug axially engaged therein, the extremity of which engages in the said peripheral groove.

6. The universal joint consisting of the forked shaft-section the trunnion-provided blocks engaged in sockets in the jaws of the shaft-sections, and the middle pivot between and engaged in opposite parallel grooves of the blocks substantially as described, said blocks having recesses extending from their ends toward and as far as the trunnions thereof and entirely through the thickness thereof, having therein the sections of absorbent material.

7. In a universal joint, in combination, two shaft-sections having respectively separated opposite pairs of journal-socketed jaws, the intermediately-arranged transmission block-sections having the outwardly-extended trunnions engaging in the sockets of one shaft-section, having the opposite parallel inner face-grooves, and also having recesses extending from their ends toward, and as far as, the trunnions thereof and provided with sections of absorbent material therein, the central pivot between and holding separated the block-sections, engaged in the grooves thereof, having their ends in the jaw-sockets of the other shaft-section, and having centrally thereof the peripheral groove, one of the block-trunnions having a duct leading therethrough to the pivot-groove, one of the trunnions having a screw-plug axially engaged therein, the inner extremity of which engages in said groove, and a further section of absorbent material frictionally held in the space between the block-sections, and inwardly in proximity to the grooved central pivot, substantially as, and for the purposes described.

Signed by me at Springfield, Massachusetts, in presence of two subscribing witnesses.

FRANK E. BOCORSELSKI.

Witnesses:
WM. S. BELLOWS,
A. V. LEAHY.